(12) United States Patent
Peters et al.

(10) Patent No.: US 6,178,860 B1
(45) Date of Patent: *Jan. 30, 2001

(54) MATCUTTER WITH CLAMPING SYSTEM AND CUTTING HEAD

(75) Inventors: Alan R. Peters, Bokeelia, FL (US); Vincent T. Kozyrski, Plainville, CT (US)

(73) Assignee: The Fletcher-Terry Company, Farmington, CT (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/151,179

(22) Filed: Sep. 10, 1998

(51) Int. Cl.[7] ........................................ B26D 7/02
(52) U.S. Cl. ............................. 83/461; 83/465; 83/468.6
(58) Field of Search ........................... 83/452, 614, 460, 83/461, 462, 465, 466.1, 468.6, 468.5; 269/292, 54.4, 10, 54.5, 319

(56) References Cited

U.S. PATENT DOCUMENTS

| | | | |
|---|---|---|---|
| 1,743,921 | * | 1/1930 | Kerley . |
| 2,556,936 | * | 6/1951 | Munschauer, Jr. ................. 83/465 X |
| 3,392,761 | * | 7/1968 | Klein ............................... 83/468.6 X |
| 3,662,635 | * | 5/1972 | Yabuta ............................. 83/468.6 X |
| 3,758,099 | * | 9/1973 | Scott .................................. 83/461 X |
| 3,945,285 | * | 3/1976 | Gebhardt ........................... 83/461 X |
| 4,519,284 | * | 5/1985 | Hunter et al. ................... 83/468.6 X |
| 5,137,399 | * | 8/1992 | Blaimschein ....................... 83/452 X |
| 5,205,197 | * | 4/1993 | Wiltshire ........................... 83/452 X |
| 5,211,090 | * | 5/1993 | Rathert . |

* cited by examiner

*Primary Examiner*—Kenneth E. Peterson
(74) *Attorney, Agent, or Firm*—Ira S. Dorman

(57) ABSTRACT

A system for clamping sheet material against an underlying support surface employs linear arrays of clamp units, each unit including a separate clamping member having a head portion with a flat top surface and a peripheral element constructed to engage an edge portion of the sheet material. The clamping members are disposed in spaced relationship along marginal portions of the support surface, and an actuating device is providing for effecting movement of the clamping members between release and clamp positions. The cutting head utilizes a blade magazine-mounting slide, the travel of which is positively limited and which has a unique pin arrangement for facilitating the interchange of separate magazines adapted for specific cutting modes.

9 Claims, 10 Drawing Sheets

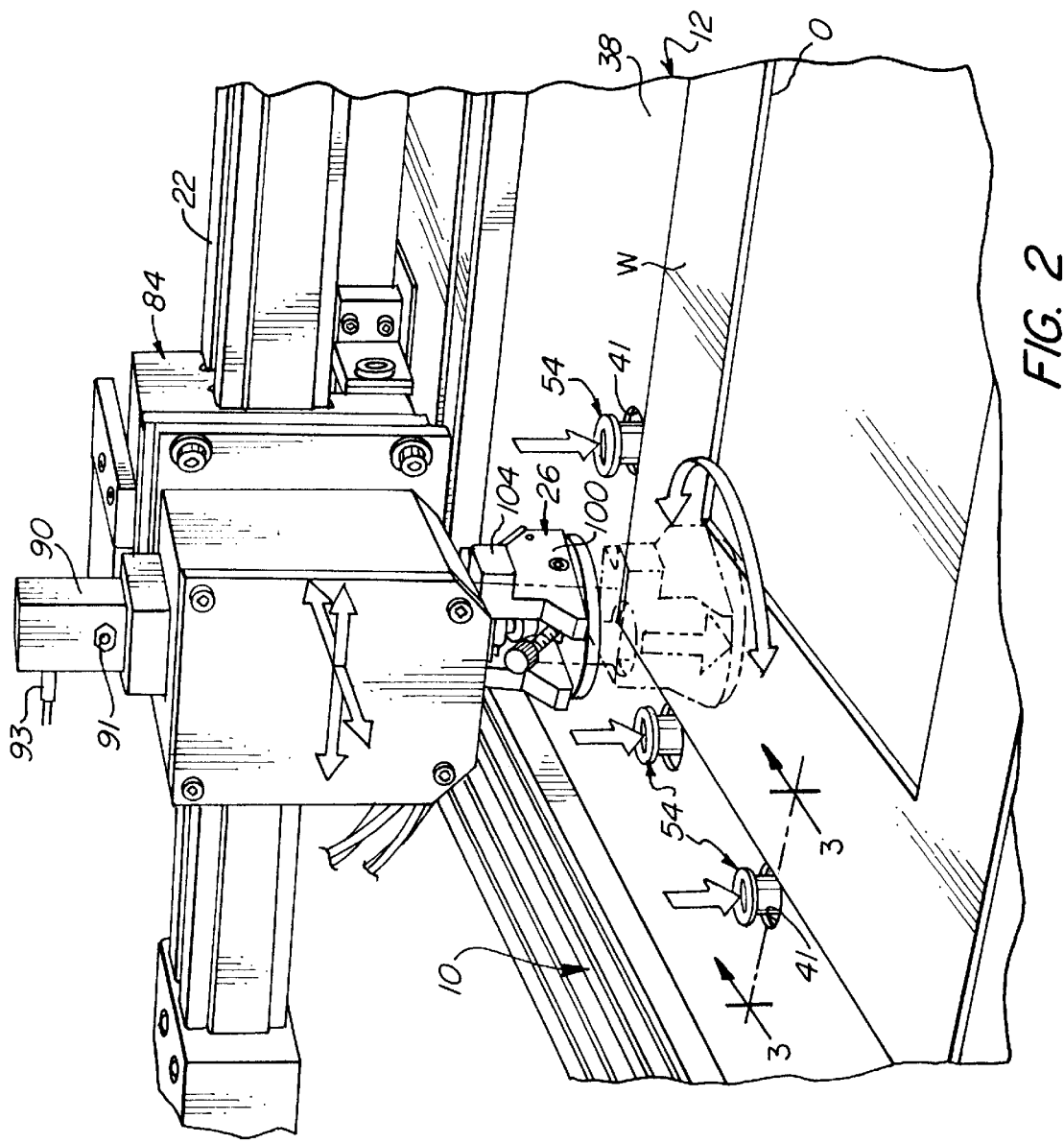
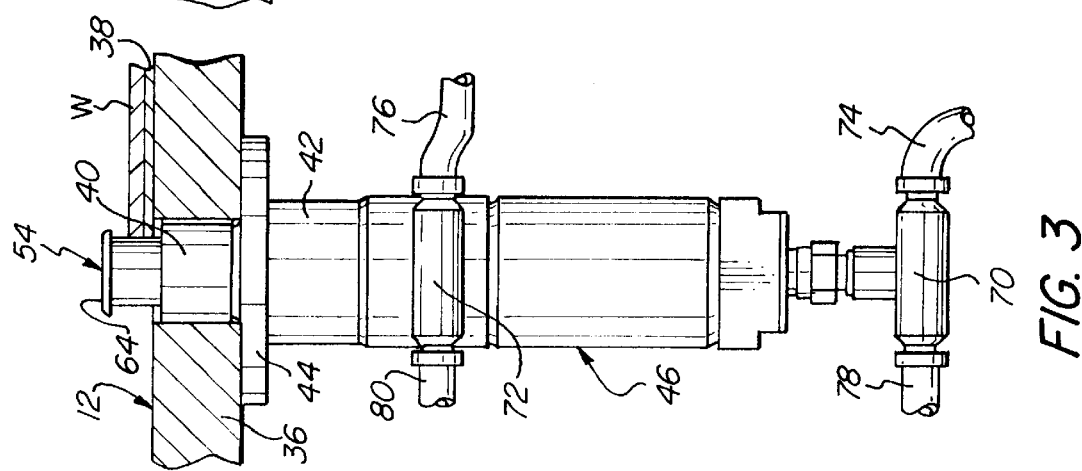
FIG. 2
FIG. 3

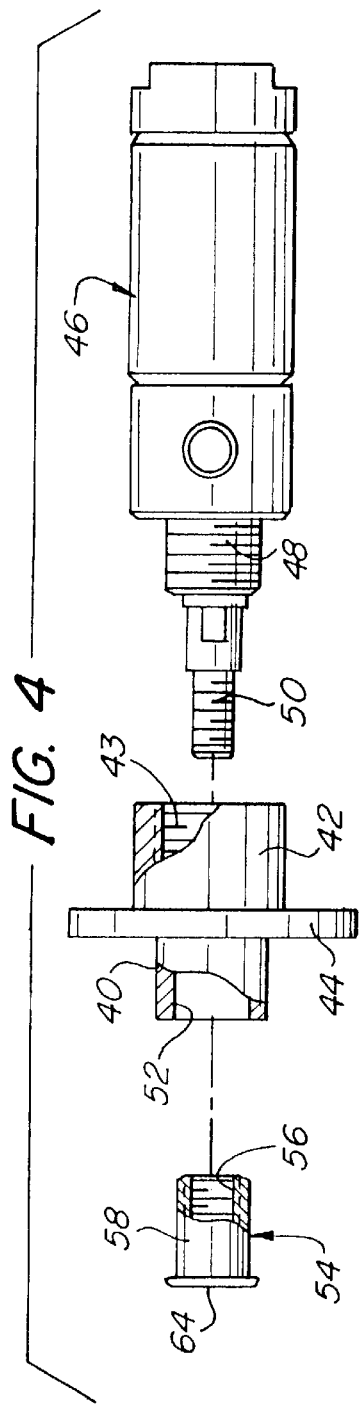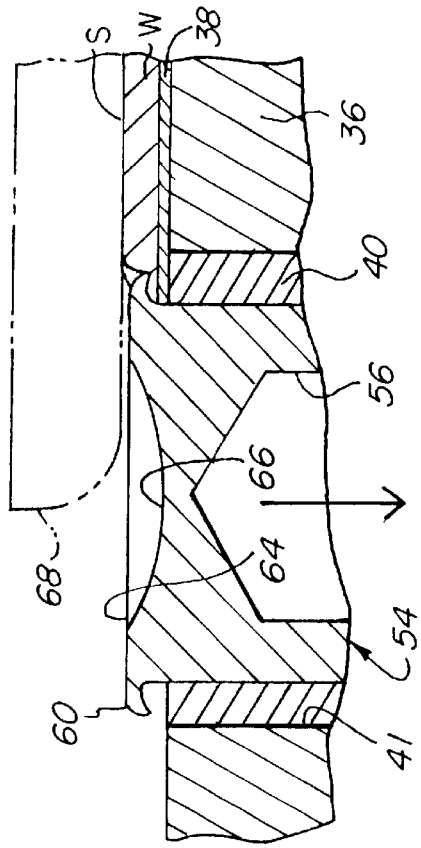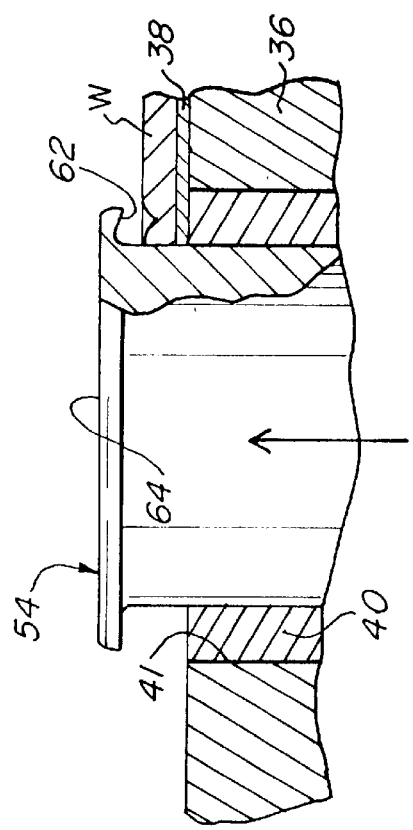

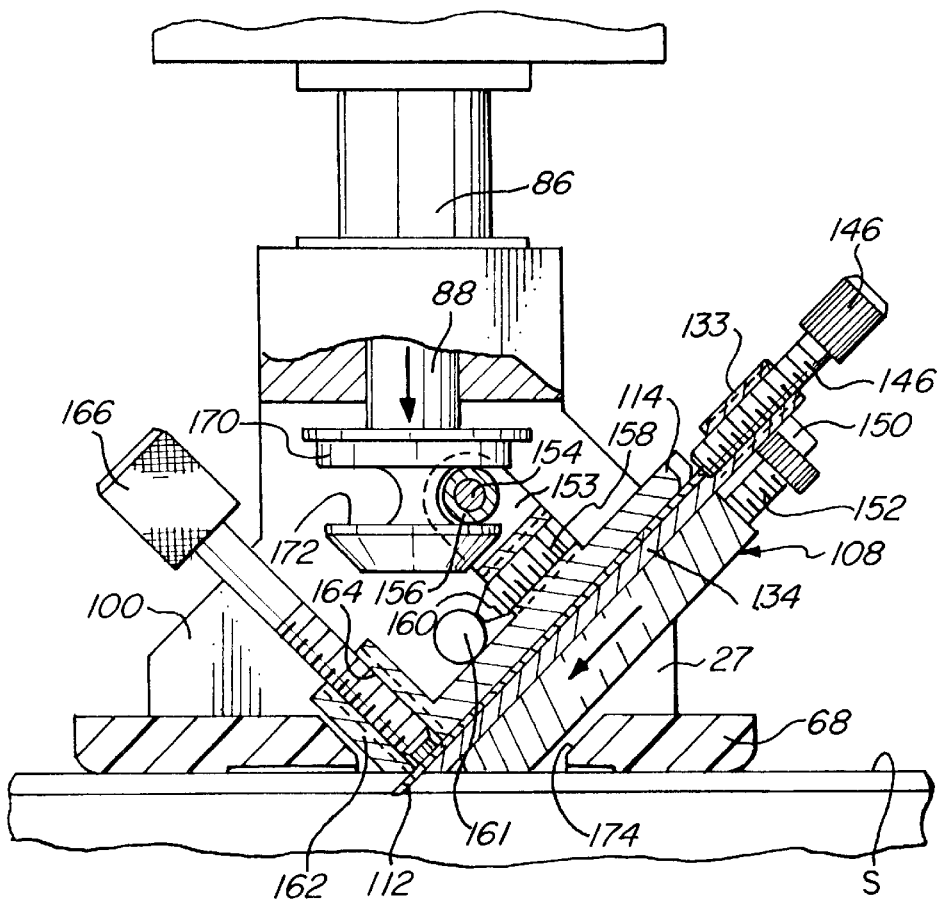
FIG. 12
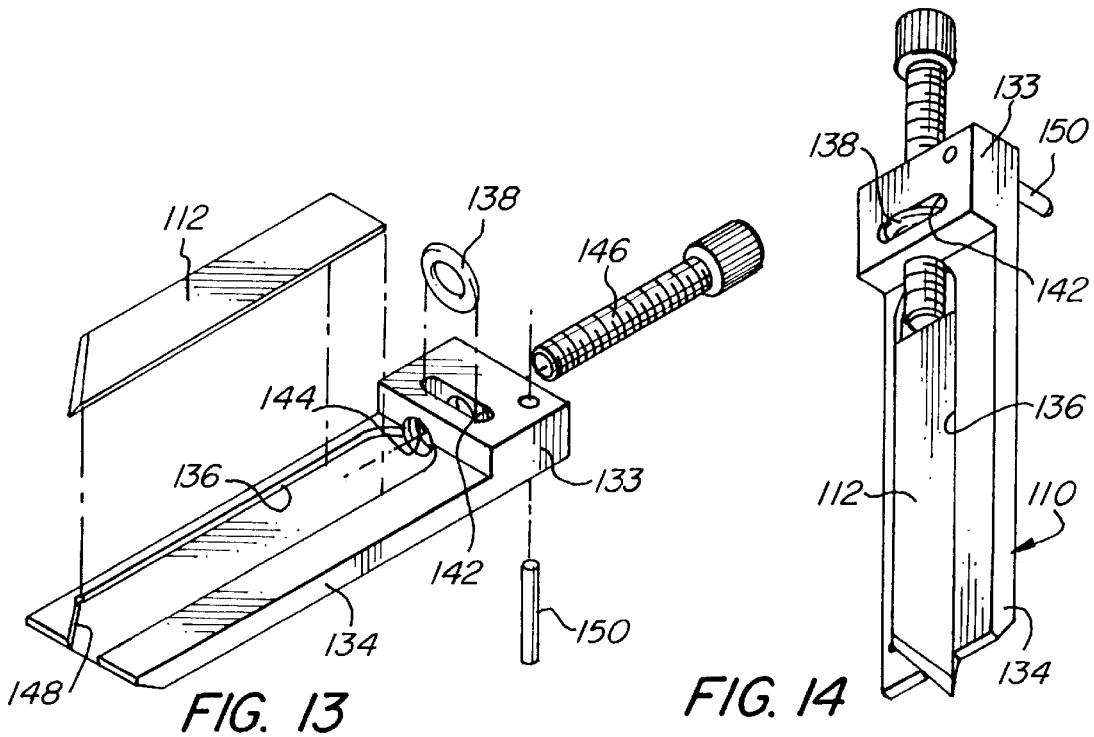
FIG. 13
FIG. 14

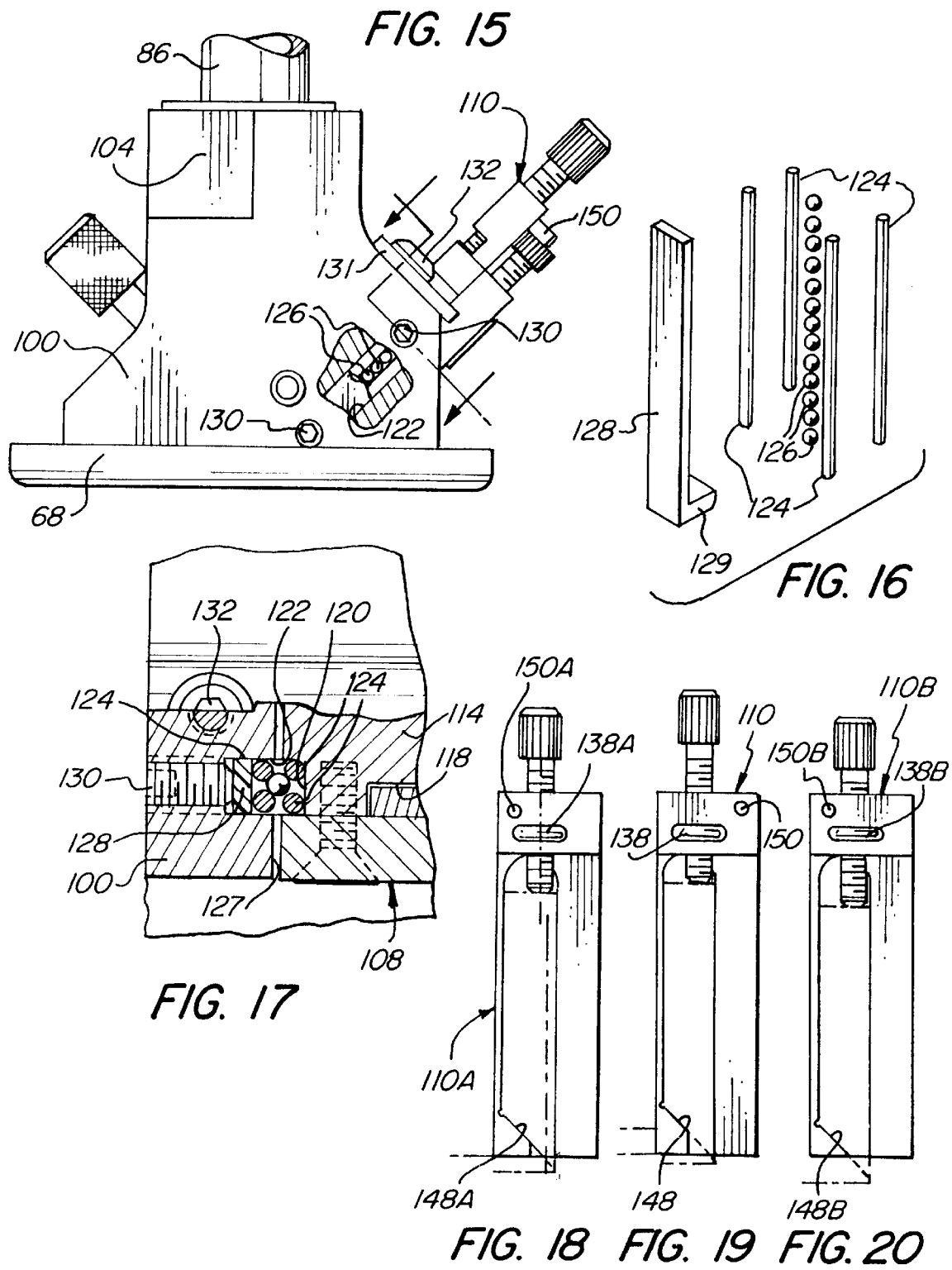

MATCUTTER WITH CLAMPING SYSTEM AND CUTTING HEAD

BACKGROUND OF THE INVENTION

Automated systems for cutting mat board and the like, which operate under computer control (CNC matcutters), are known in the art and are commercially available (See for example the article entitled "Computerized Automated Matcutters" by Robert Palmer, *PFM Magazine*, May 1995, pages 66–86.) The cutting head employed in such apparatus typically has an associated glide plate that surrounds the tip of the blade, which facilitates movement over the board and improves cutting.

A difficultly that arises due to the presence of such a glide plate concerns interference with elements used for clamping the workpiece in place against the machine table. The clamping elements not only limit the closeness of approach of the blade to the edge of the board, and consequently border width, but they also preclude sizing (i.e., cutting of a smaller piece of mat board from a larger one) because the blade cannot move all the way to the edge of the workpiece.

Other deficiencies that are typically present in matcutters of the prior art concern operation of the head itself. For example, the motion of the head components by which blade plunging is effected is often not sufficiently smooth and well-controlled to enable the production of optimal cuts, and the construction often does not afford facile and precise relative positioning of the parts comprising the head.

SUMMARY OF THE INVENTION

Accordingly, it is a broad object of the present invention to provide a novel system for clamping a sheet of material against an underlying support surface.

A more specific object is to provide such a clamping system which is specially adapted for use with a cutting head having a glide plate, and in a computerized automated matcutter.

It is also a broad object of the present invention to provide a novel cutting head assembly suitable for use in a matcutter, and especially a computerized automated matcutter, wherein operation of the components is smooth and well controlled, and they are constructed for facile and precise relative positioning and repositioning.

It has now been found that certain of the forgoing and related objects of the invention are readily attained by the provision of a system for clamping sheet material, comprising: a base having a support surface with a marginal portion, a plurality of clamp units, each including a separate clamping member, and actuating means for effecting movement of the clamping members between release and clamp positions and for applying clamping force in the clamp positions. Each clamping member has a head portion with a substantially flat top surface and a peripheral element constructed to engage thereunder an edge portion of a sheet material. The clamp units are arranged with the head portions of the clamping members disposed within the marginal portion of the support surface and spaced from one another therealong; in the release and clamp positions the head portions are spaced relatively away from and proximate to the support surface, respectively.

Usually, the marginal portion of the support surface will comprise two margin components extending at an angle (normally 90°) to one another. The number and arrangement of clamp units will usually provide a plurality of clamping member head portions, normally at least three, rectilinearly aligned along each of the margin components.

In preferred embodiments each of the clamping members will comprise a stem portion on which the head portion is disposed, with the stem portions passing through the marginal portion of the support surface and with movement of the clamping members between their release and clamp positions occurring on the axes thereof; the stem portions will generally provide elements against which the sheet material may be abutted for proper positioning on the support surface. Most desirably the head portion of each clamping member will provide a narrow, thin lip extending at least partially about the stem portion, with the lip constituting the sheet material-engaging peripheral element and advantageously having a relatively sharp lower, outer edge; the head portion will typically be substantially circular and the lip is substantially annular, but other shapes (e.g., square) may provide better clamping characteristics. Although mechanical or eletromechanical actuation may be provided, each of the clamp units will desirably include a double-acting pneumatic system (or motor) comprised of a piston to which the clamping member is operatively connected, and a cylinder, the actuating means provided comprising means for selectively delivering pneumatic pressure to the cylinder.

Other objects of the invention are attained by the provision of a machine for cutting a sheet material comprising, in addition to the clamping system described, a cutting head assembly and means for supporting the assembly for movement over the support surface of the base. The cutting head will normally include a cutting element surrounded by a glide plate, the cutting element and guide plate being disposed for contact with sheet material supported on the support surface. Such a machine will most desirably include electrical drive means for effecting movement of the cutting head on the means for supporting, and electronic data processing means for controlling the electrical drive means and thereby the movement of the cutting head (generally in an X-Y mode).

Still other objects of the invention are attained by the provision of a head assembly for a cutting machine, comprising a head having mounting-means for movement of the assembly on an axis, and defining a first channel oriented at an oblique angle to the axis; a slide mounted for slidable movement in the head channel, between a withdrawn blade position and a plunged blade position, the slide having a second channel therein extending substantially parallel to the first channel for receiving a blade-holding magazine inserted thereinto; and such a magazine dimensioned and configured for slidable insertion into the second channel (in the slide). The slide and head have first cooperating mechanical means thereon for adjustably limiting the movement of the slide to the plunged blade position, and the slide and magazine have second cooperating mechanical means thereon for adjustably limiting the depth of magazine insertion in the second channel.

Such a head assembly will preferably include a linear motion support system for the slide, which support system comprises, on each of two opposite sides of the slide, an array of at least three elongate rectilinear elements mutually spaced to define a passage therewithin, and a multiplicity of bearing elements loosely stacked within the defined passage. The slide may advantageously have a boss defining a threaded aperture that opens to the second channel, with a tightening screw received within the aperture for clampingly engaging a cutting blade received in the magazine. Most desirably the assembly will comprise at least a second magazine, with a locating component of the second cooperating means on the first-mentioned magazine being disposed differently from the corresponding locating component on the second magazine, and with the slide having separate abutment components for independently engaging each of the locating components of the first and second magazines.

BRIEF DESCRIPTION OF THE DRAWINGS

FIG. 2 is a fragmentary perspective view drawn to an enlarged scale, showing a section of the cutter of FIG. 1 including the cutting head assembly and its mounting track, and the mat-supporting table;

FIG. 3 is a sectional view, taken along line 3—3 of FIG. 2 and depicting one of the clamping units in greater detail, drawn to a further enlarged scale;

FIG. 4 is an exploded elevational view, in partial section, showing the clamping unit of FIG. 3;

FIGS. 5 and 6 are fragmentary sectional views, drawn to a further enlarged scale, showing the button of the clamping unit in its lowered and elevated positions, respectively;

FIGS. 10, 11, and 12 are fragmentary sectional views, taken generally along line 9—9 of FIG. 9, showing raised (FIG. 10) and lowered (FIGS. 11 and 12) positions of the cutting head assembly, and withdrawn (FIGS. 10 and 11) and plunged (FIG. 12) positions of the blade-mounting slide;

FIG. 13 is an exploded perspective view showing the components of the blade magazine;

FIG. 14 is a perspective view showing the magazine components in assembled relationship;

FIG. 15 is a fragmentary elevational view of the cutting head assembly with a portion broken away to expose the elements by which the magazine-mounting carrier slide is supported;

FIG. 16 is an exploded perspective view showing components of the slide-mounting arrangement;

FIG. 17 is a fragmentary view of the cutting head assembly, with a portion broken away to show the magazine-mounting slide and its supporting elements;

FIGS. 18, 19, and 20 illustrate three different blade magazine assemblies which may alternatively be employed in the cutting head assembly of the apparatus;

DETAILED DESCRIPTION OF THE PREFERRED AND ILLUSTRATED EMBODIMENTS

Figure 1:
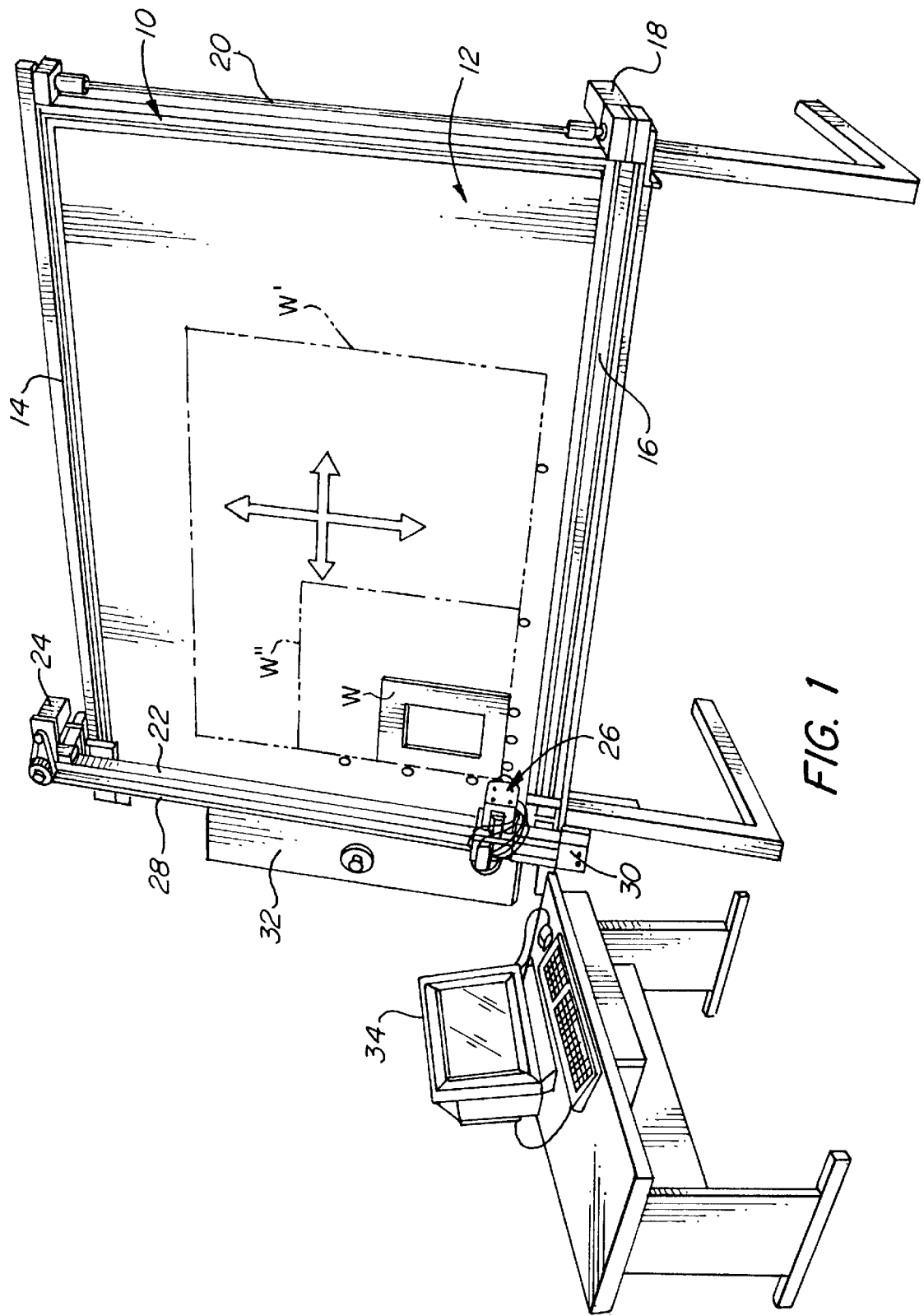
FIG. 1 is a perspective view of a computerized automatic matcutter embodying the present invention.

Turning now in detail FIG. 1 of the drawings, therein illustrated is a computer-operated matcutter embodying the present invention, including a vertical unit for supporting the workpiece and the cutting head and associated mechanisms. More particularly, the vertical support unit includes a rectangular frame, generally designated by the numeral 10, within which is mounted a rectangular table 12. Top and bottom rails 14, 16, respectively, provide horizontal "X" direction gantry tracks, by which a "Y" direction gantry track 22 is slidably supported at its opposite ends. A stepper motor 18 is disposed at one end of bottom rail 16, and is fitted with a pinion for driving an endless timing belt (not seen) in a continuous circuit along the bottom of the frame; a similar timing belt is provided along the top of the frame, and is driven by the motor 18 through a suitable connecting shaft 20, the timing belts serving to effect movement, in the X direction, of the Y gantry 22. A second stepper motor 24 is disposed at the upper end of the gantry 22, and drives another timing belt 28 in a continuous circuit along the gantry 22, suitable reversing units being provided, as at 30. A control cabinet 32 is supported at one end of the frame 10, and contains computer components and control elements for operation of the cutter, and an operator's terminal 34 is provided adjacent the unit. The computer software displays icons which show directly, for selection, the numerous shapes that can be cut; it also prompts the entry of dimensional parameters, cutting mode choices, etc. A cut workpiece W is clamped upon the surface of the table 12; a large workpiece W' and a smaller workpiece W" (both shown in phantom line) illustrate-pieces of mat board from which the workpiece W may be cut, in sizing operations, utilizing the cutter of the invention.

With particular reference now to FIGS. 2 through 6 of the drawings, the clamping units that are used to hold the workpiece in position against the surface of the supporting table 12 are shown in detail. The table 12 consists essentially of a base 36 (e.g., of wood), over which will normally be positioned a slip sheet 38. A cylinder bracket, consisting of an outer collar portion 40, an inner mounting portion 42, and an interposed annular flange 44, is mounted with the outer collar portion 40 extending through a circular hole 41 formed in the base 36. A double-acting pneumatic cylinder, generally designated by the numeral 46, has a threaded stub 48 on one end which is engaged within the inner collar portion 42, the latter being matingly threaded at 43 for that purpose. The threaded end portion 50 of a piston (not seen) extends through the passage 52 of the cylinder bracket and serves to mount a clamping button, generally designated by the numeral 54, the button having a threaded recess 56 in its cylindrical body portion 58 for engagement of the shaft end portion 50.

The head portion of the clamping button 54 comprises an annular lip 60, which is circumferentially undercut to define an inwardly tapered shoulder 62; the screwdriver slot 66 in the top of the button may be used to facilitate attachment and removal. As best seen in FIG. 5, the workpiece W is engaged under the lip 60 of the button 54 in its retracted position, with the taper of the shoulder promoting penetration into the surface of the workpiece and thereby enhancing the grip thereupon. It is to be noted that the surface 64 of the head portion of the button 54 lies flush with (or slightly below) the upper surface S of the workpiece W in the clamping position. Because of that relationship the glide pad 68 (shown in phantom line in FIG. 5) can pass without impediment from the surface S of the workpiece over the surface 64 of the clamping button 54, which feature constitutes a primary benefit of the invention. It will also be noted from FIG. 1 (and also from FIG. 21) that a multiplicity of clamping units are arranged along both the X axis and also the Y axis of the table 12. Although spacing is not critical, the particular arrangement shown in FIG. 1 is beneficially designed to provide optimal clamping for a wide range conventional sizes in which mat board is provided and to which it is to be cut.

Attached to the bottom of the double-acting pneumatic cylinder 46 is a Tee connection 70, and a like Tee connection 72 is attached near the top. Air injected into the bottom cylinder through line 74 (from a source to be described) elevates the piston of the cylinder and, in turn, raises the clamping button 54 to its release position of FIG. 6; conversely, pressurized air delivered through line 76 to the upper Tee connection 72 will (with release of the pressure at the bottom of the cylinder) drive the button 54 downwardly and maintain it in the clamping position shown in FIG. 5. Lines 78 and 80 lead from the Tee connections 70 and 72 for the supply of pressurized air to downstream cylinders, which are connected in series.

As mentioned above, a very significant disadvantage that is inherent in clamping systems of the prior art is attributable to the interference that clamping elements employed present to movement of the glide pad that is conventionally associated with the cutting head. Because the clamping buttons 54 of the units employed in the present cutter lie flush with the surface of the mat clamped board (or substantially so), the pad can readily pass thereover, enabling the blade to move fully to the edge of the workpiece. In those instances in which the cutting blade is in such position that it would itself encounter a clamping button, computer control can be utilized to shift the entire cutting pattern as necessary to cause the blade to bypass the button, in a manner analogous to a standard "trimming" operation. Alternatively, it is possible to mount the clamping units so they are themselves movable out of the path of the blade, e.g., on a mounting strip that is embedded in or affixed to the support table.

FIG. 2 shows the cutting head assembly 26, mounted upon a carrier generally designated by the numeral 84, which is in turn slidably engaged on the Y gantry 22 for translation therealong, as driven by the motor 24 and associated timing belt 28. Precise movement of the carrier 84 along the gantry 22, and of the gantry 22 along the X gantries 14 and 16, is achieved in accordance with principles and mechanisms that are well known in the art of computerized automated cutters for mat board and other materials.

Figure 7:
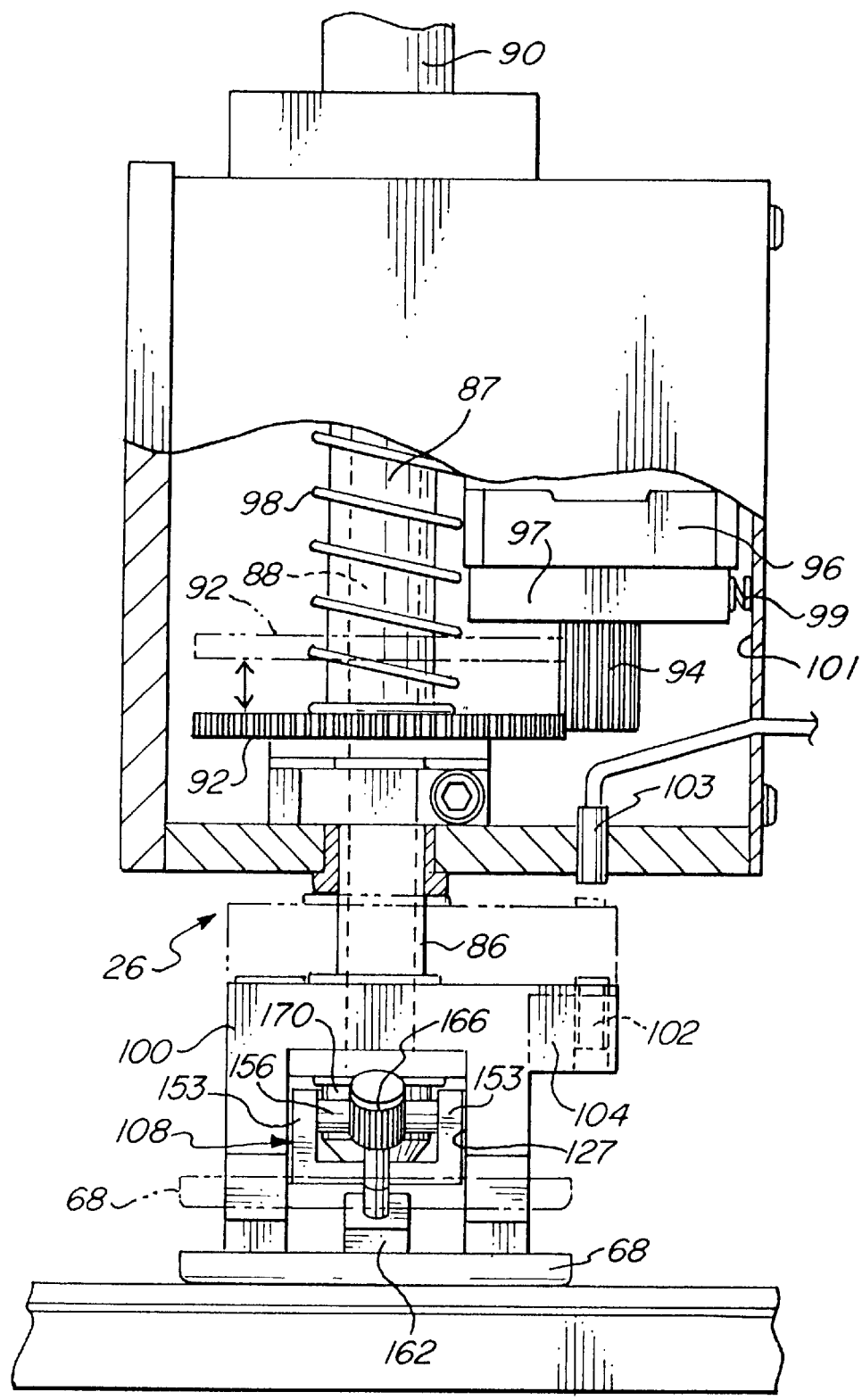
FIG. 7 is a fragmentary elevational view, in partial section, showing the cutting head assembly and operating mechanism, and an underlying section of the table and workpiece.
Figure 8:
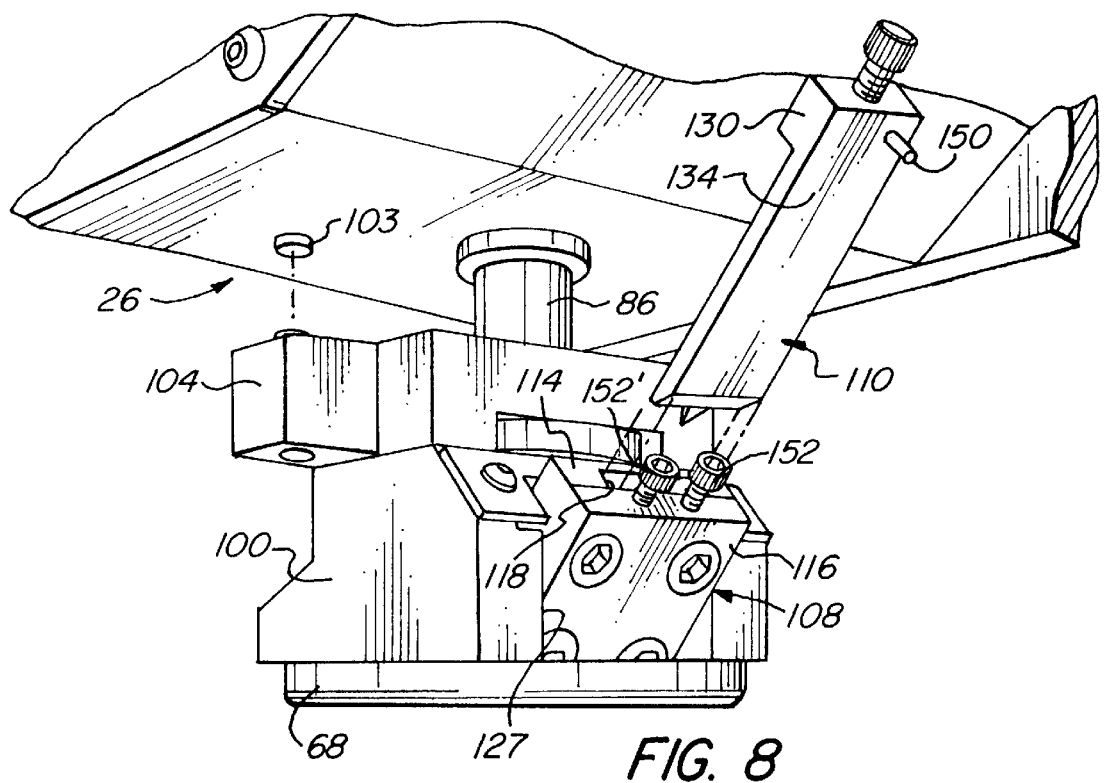
FIG. 8 is a fragmentary perspective view of the cutting head, with the blade magazine thereof shown in exploded relationship.
Figure 9:
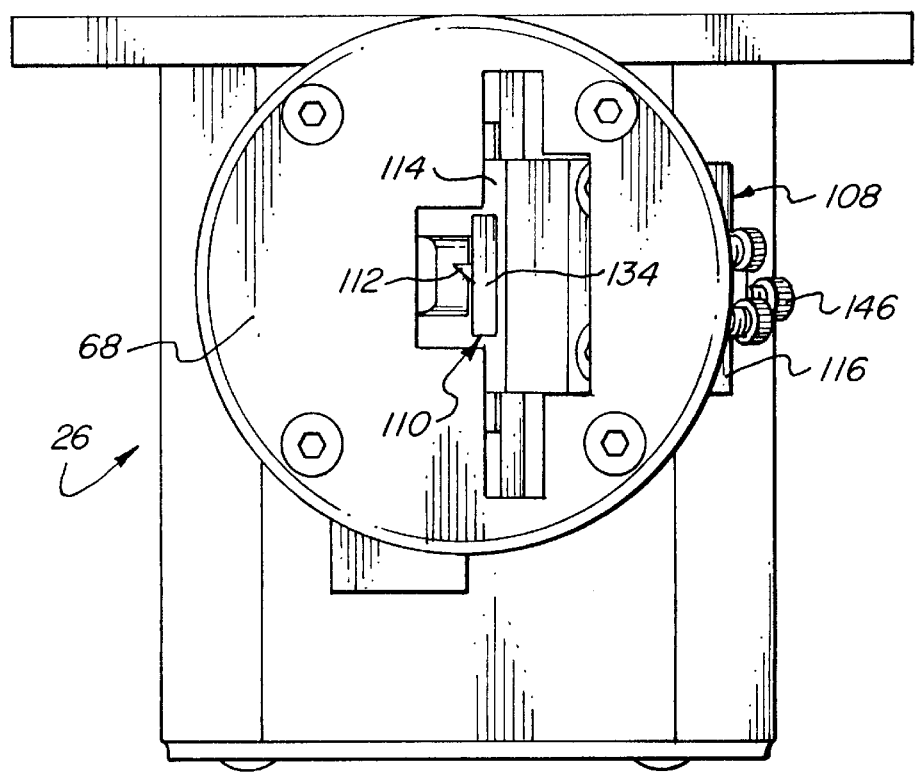
FIG. 9 is a bottom view of the cutting head assembly.

As is best seen in FIG. 7, the cutting head assembly 26 includes a head sleeve 86, which coaxially receives a center shaft 88 which is in turn coupled to the double-acting piston (not visible) of a pneumatic cylinder 90. A circumferential shoulder (also not visible) extends about the bore of the head sleeve 86 and engages elements on the center shaft 88 in its downward travel, to move conjointly therewith. A spur gear and collar unit 92 is clamped to the sleeve 86, the gear portion of which is in meshing engagement with the pinion gear 94 of a stepper motor 96. The motor 96 is mounted upon a slidably supported plate 97, to which a lateral bias is applied by coil spring 99, which bears upon the adjacent wall 101 of the cutting head assembly housing; this arrangement serves to keep the pinion gear 94 in uniform meshing engagement with the spur gear 92, thereby avoiding backlash and minimizing motor noise. Coil spring 98 surrounds a nylon sleeve 87, mounted on the head sleeve 86, and applies a downward bias to the cutting head assembly 26. The double-acting cylinder 90 has coupling elements 91, 93 for connection to a pneumatic system (to be described) in such manner that pressure can be applied to either side of the operating piston so as to positively effect raising and lowering of the head assembly 26.

As will be apparent, the head assembly is rotated (through a 360° angle) by the motor 96, acting through the spur and pinion gears 92, 94. The frame 100 of the head assembly includes a block portion 104 in which a permanent magnet 102 is mounted. The magnet 102 cooperates with a sensor 103 to generate a signal that indicates when the magnet and sensor are in alignment, and hence when the cutter assembly 26 in its home position; the angular position of the head assembly, as rotated by the motor 96, is thereby precisely controlled (through computer software).

The frame 100 of the head assembly 26 obliquely mounts a slide assembly, generally designated by the numeral 108 which, in turn, carries a blade magazine assembly, generally designated by the numeral 110; the magazine assembly includes a Dexter No. 3 style cutting blade 112. The slide assembly 108 includes a body 114, into which is machined a U-shaped channel 118 that extends along its length and in which the magazine assembly 110 is seated. A groove 120 is formed in each of the two lateral edges of the body 114, and extends lengthwise thereof, parallel to the channel 118; the groove 120 on one side of the body 114 is best seen in FIG. 17, the body 114 being symmetric about the longitudinal centerline of the channel 118.

The frame 100 of the head assembly 26 is formed with an oblique channel 127 in which the slide assembly 108 is seated. A lateral slot 122 extends along each side of the channel 127 in registry with the groove 120 along the opposite sides of the slide body 114; again, only one of the head slots 122 is illustrated, and is best seen in FIG. 17. A pair of dowel pins 124 extend longitudinally along each of the body slots 120, and a cooperating pair extend longitudinally in the head slots 122. A column of spherical ball bearings 126 (13 bearings being employed in the illustrated embodiment) are loosely disposed in the space between each set of dowel pins 124 (two cooperating pairs), to provide a frictionless linear mounting for the slide 108 within the head frame 100. An L-shaped steel rail 128 is seated within each slot 122 of the head, and includes a lower leg portion 129 to provide underlying support for the column of ball bearings 126. A pair of set screws 130 extend through the head frame 100 into communication with the slot 122, and bear upon the longer leg of the rail 128; the set screws 130 enable an adjustable force to be applied to the dowel pins 124 and bearings 126, with any force applied being effectively balanced between the opposite sides of the slide assembly 108. A cover plate 131 is held in place on a shoulder portion of the frame 100 by screws 132, and serves to prevent escape of the ball bearings 126 from the upper ends of the slots 120, 122. It might be pointed out that the travel distance of the slide 108 is sufficiently limited that the bearings 126 make no more than a single revolution during movement of the slide from its most outward to its most inward position, thereby minimizing adverse scuffing effects; it is unnecessary to separately retain the bearings 126, as within a cage or the like.

As is best seen in FIGS. 13 and 14, the blade-holding magazine of the assembly 110 consists of an elongate body portion 134 which is longitudinally slotted at 136 to receive the blade 112. A magazine head portion 133 is transversely slotted at 142, and has formed therethrough an axially extending threaded aperture 144 in which the screw 146 is engaged. The screw 146 passes through an O-ring 138 seated in the slot 142, and bears against the end of the blade 112 to secure it in position against the oblique shoulder 148 that defines the outer end of the slot 136. A locating pin 150 projects rearwardly from the magazine head portion 130.

The locations of the oblique shoulders 148 and the locating pins 150 distinguish the three magazine assemblies depicted in FIGS. 18 through 20 from one another. As can be seen in FIG. 18, the pin 150A is on the left side of the magazine assembly 110A (as viewed from the front); in the magazine assembly 110 shown in FIG. 19 (and FIGS. 13 and 14), the pin 150 is on the right, and the shoulder 148 is spaced somewhat further from the leading end of the body 134 than is the shoulder 148A; the pin 150B in the magazine assembly 110B of FIG. 20 is on the left and the shoulder 148B is spaced slightly closer to the leading end of the body 134B than is the shoulder 148A. The magazine assembly 110A is adapted for use for standard cutting operations; magazine assembly 110 is adapted for V-grooving, because the blade must make a shallower cut so as to avoid penetrating entirely through the mat; magazine assembly 110B is adapted for deep cutting, such as to penetrate multiple plies of mat board. The O-rings 138, 138A and 138B of the respective magazines assemblies are color-coded so as to enable facile selection by the operator. It will be appreciated that, although the magazine assembly described herein includes certain features that are similar to those of the magazine described in Kozyrski et al. U.S. Pat. No. 4,867,023, the instant assembly is unique and particularly well-adapted for the purposes for which it is intended.

Consistent with the described functions, the pins 150, 150A and 150B are positioned to register with one or the other of the two locating screws 152, 152' engaged in the slide assembly cover 116 and projecting upwardly therefrom. The pins 150A and 150B will engage the head of the screw 152 when fully inserted, and the pin 150 will engage the head of the screw 152'. Needless to say, the screws 152, 152' are adjustable so as to enable close control of the extend of projection of the tip of the blade 112.

A pair of ears 153 project upwardly and forwardly from the slide body 114, and mount a short rod 154 therebetween on which is in turn supported a roller 156, the function of which will be described presently. A threaded aperture 158 extends longitudinally at the base of the ears 153, and receives a set screw 160 which is positioned to engage a crossbar 161, which extends between portions of the head frame 100 and serves to limit downward travel of the slide assembly within the head channel 127.

A collar 162 projects normally to the plane of the slide body 114, and has a threaded aperture 164 therethrough in which is engaged a clamping screw 166. Tightening of the screw 166 against the blade 112 serves to secure it and the magazine assembly 110 in fixed position with the slide assembly 108.

The center shaft 88 extends axially through the head frame 100 and the head sleeve 86. It is operatively connected to the piston within the cylinder 90 at its upper end, and it has a spool structure 170 at its lower end, formed with a circumferential channel 172. The rod and roller assembly 154, 156, which is mounted by the ears 153, is engaged within the channel 172 of the spool structure 170; axial movement of the center shaft 88 will thus effect oblique movement of the slide assembly 108 within the head slot 27.

Figure 10:
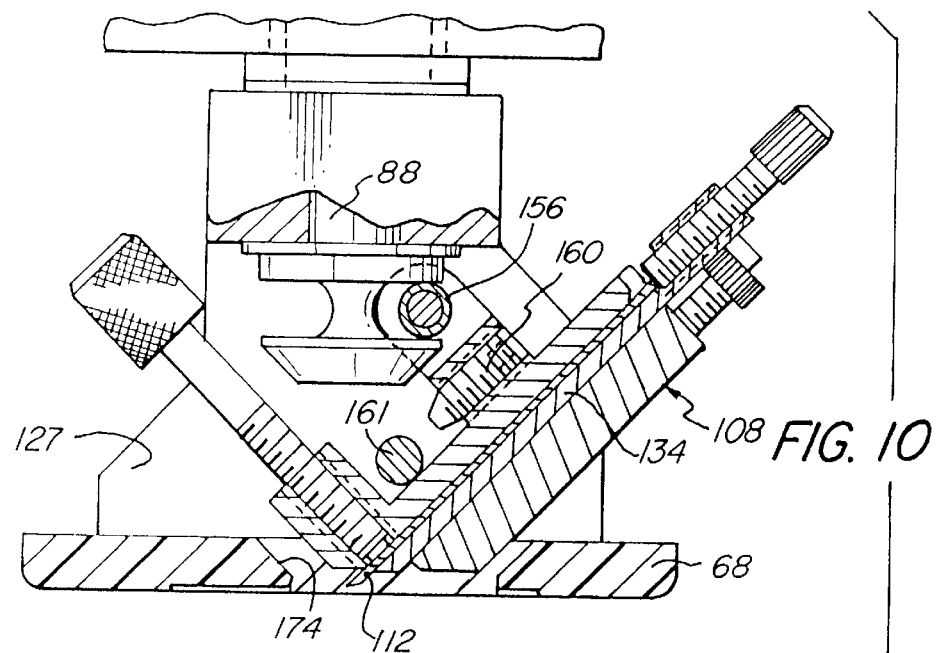
Figure 11:
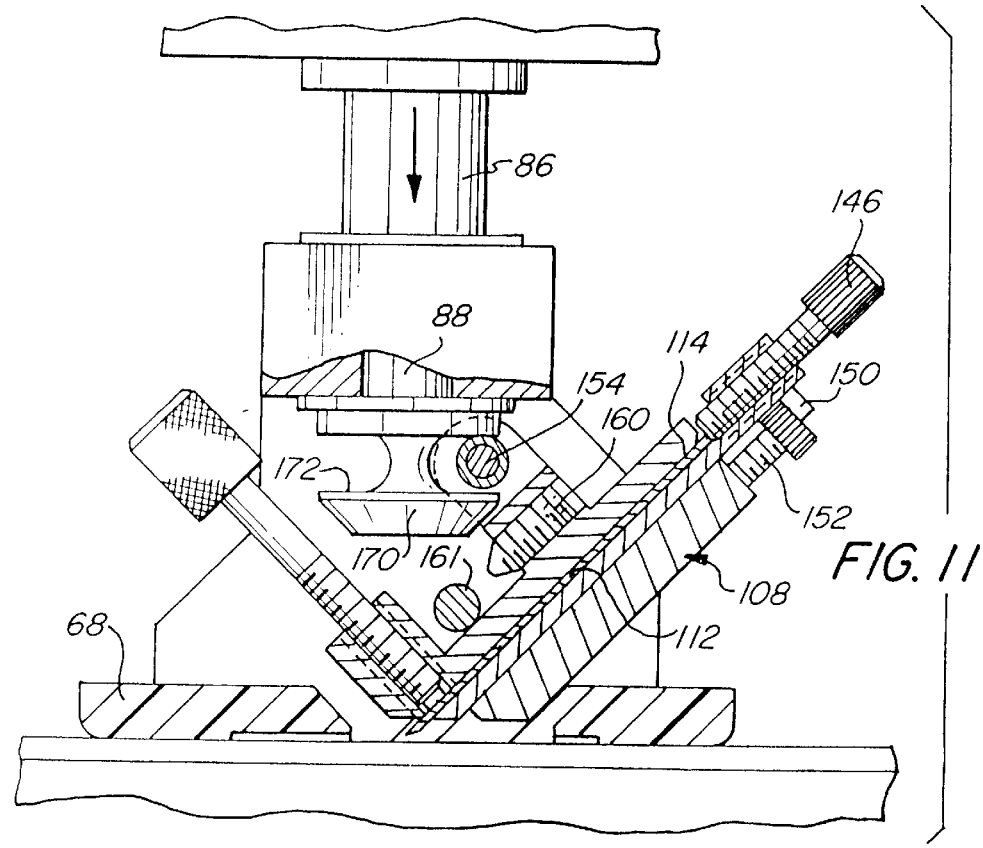

Generally describing operation, the fully retracted position of the cutting head is shown in FIG. 10, and is achieved by the application of pneumatic lifting pressure to one side of the piston within the cylinder 90. Upon release of that pressure, the coil spring 98, acting upon the spur gear and the collar unit 92, will thrust the head assembly 26 downwardly and bring the glide plate 68 into contact with the surface S of the workpiece W. Pneumatic pressure that builds within the cylinder 90 on the opposite side of the piston will then force the center shaft 88 downwardly, in turn shifting the slide assembly 108 and causing the cutting tip of the blade 112 to project through the glide plate opening 174 and to plunge into the workpiece W. Translational movement of the Y gantry 22 on the top and bottom rails 14, 16, translational movement of the carrier 84 on the Y gantry, and rotation of the head assembly 26 by the stepper motor 96, will cause the blade 112 to cut the selected, programmed opening "O" in the workpiece W. Upon completion of the cutting operation the pneumatic pressure delivered to the cylinder 90 will be shifted to lift the cutting head assembly 26 away from the workpiece, against the force of the spring 98, awaiting a subsequent command from the terminal 34 and the computer 32.

Figure 21:
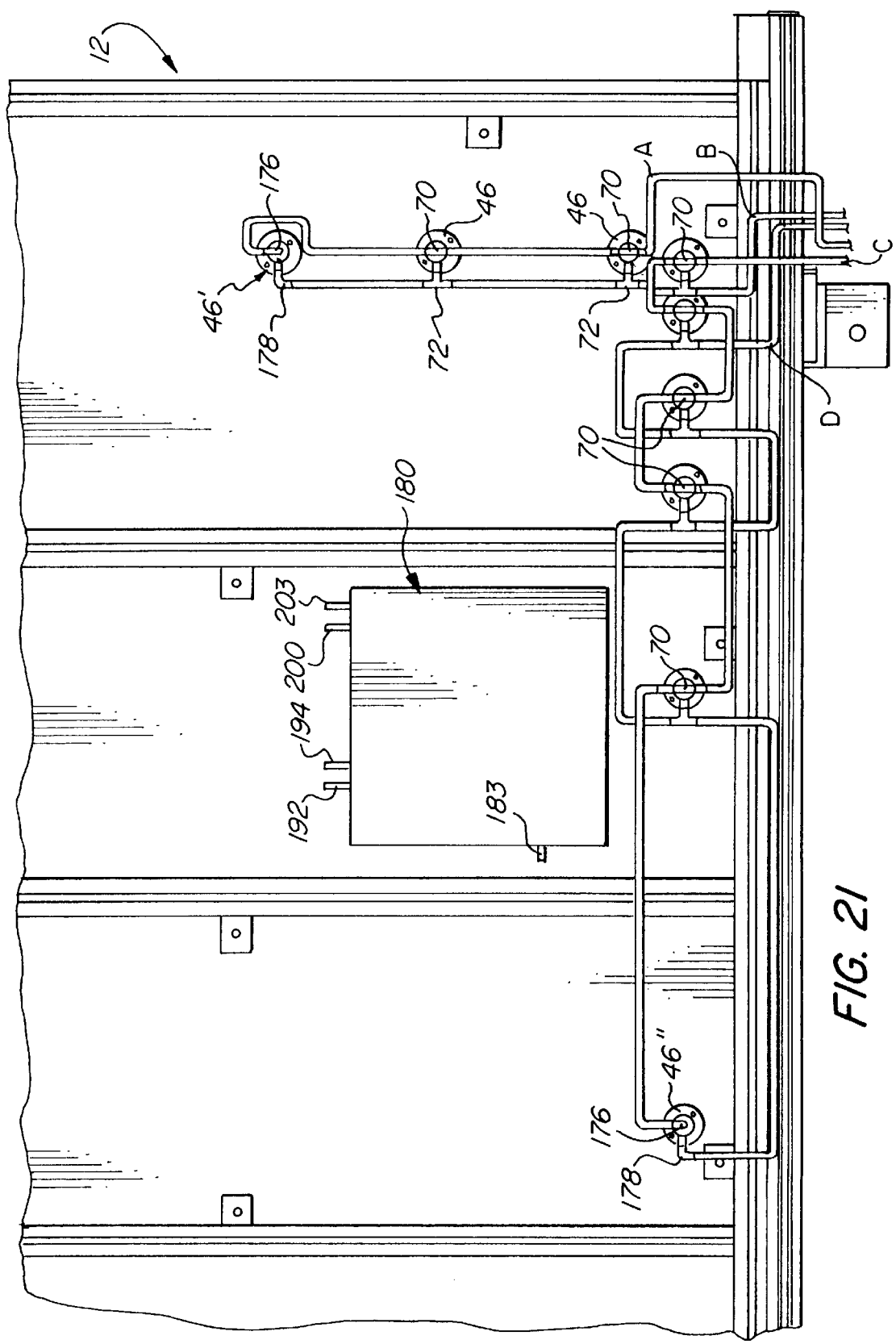
FIG. 21 is a fragmentary rear view of the table of the matcutter, showing the pneumatic system and control box for operating the clamping units and the cutting head assembly.
Figure 22:
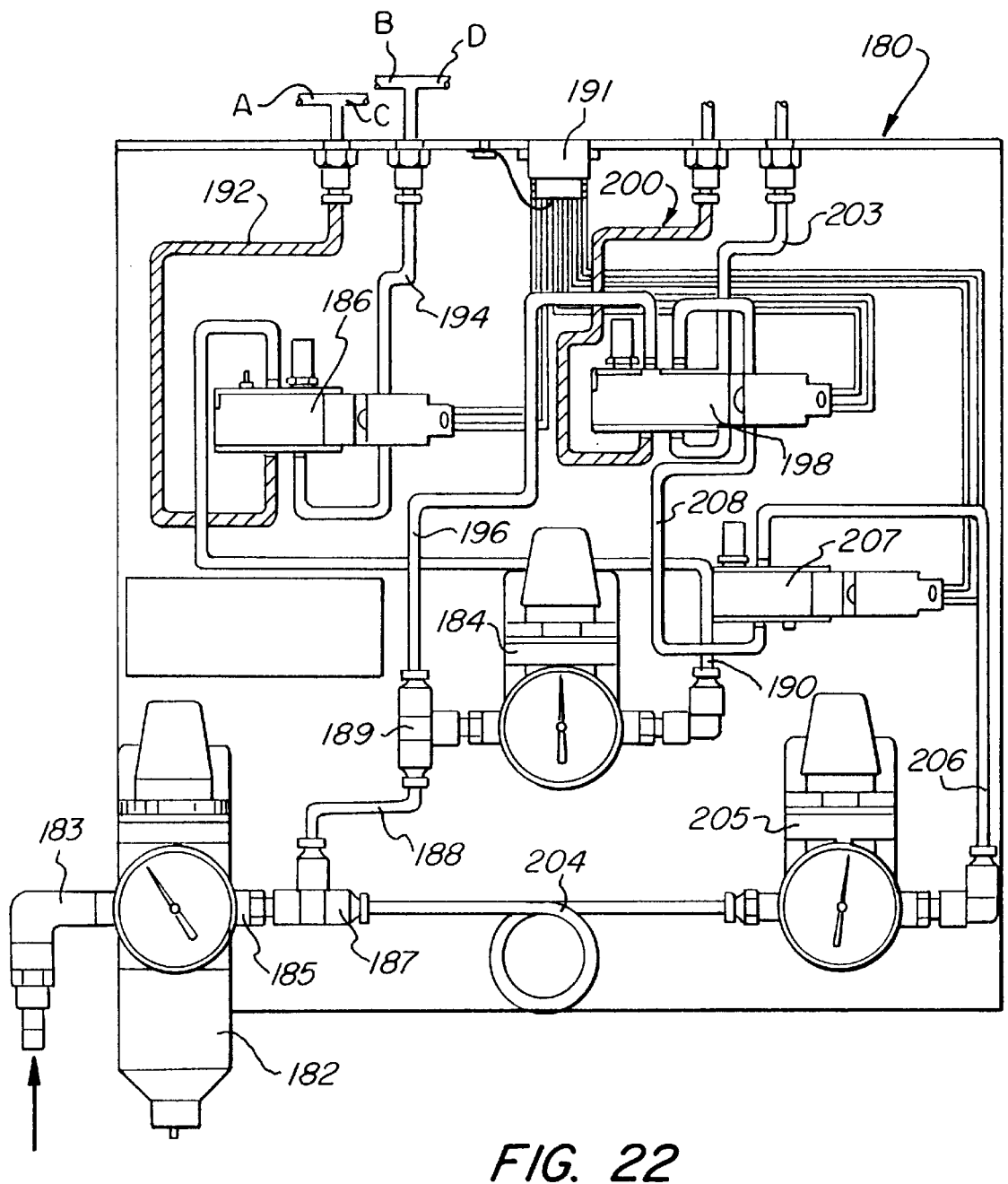
FIG. 22 is a diagram showing the pneumatic control panel assembly of the apparatus.

FIG. 21 shows the back side of the table 12, against which is mounted the pneumatic control unit, generally designated by the numeral 180, and the system of pneumatic conduits that connect the cylinders 46 of the clamping units thereto. A first line A connects in series the Tee connector 70 of each cylinder 46 of the vertical array, terminating at an elbow connector 176 on the end-most cylinder 46'. Pressure through line A will force all of the clamp buttons 54 of the vertically aligned clamping units to their elevated, release positions. Line B is attached to the Tee connectors 72 of the same units, again ending in an elbow 178, and serves to deliver pressurized air to the opposite sides of the cylinder pistons so as to shift the buttons 54 to their downward, clamping positions. Similarly, line C is attached to the Tee connectors 70 of the horizontal array of cylinders 46 to impart lifting forces, ending at an elbow connector 176 of the end-most cylinder 46"; the line D terminates at elbow 178, and conducts pressure for closing of the horizontally aligned clamp units.

The pneumatic control unit 180 includes a main regulator 182 having a connector 183 for receiving line pressure; typically, the regulator 182 will deliver air at 50 psi pressure. The outlet 185 from the regulator 182 is joined to a Tee connector 187, one leg of which is connected to line 188 which leads to a Tee 189. One branch of the Tee 189 is connected to a regulator 184, typically set to deliver 30 psi pressure, from which extends a line 190 that is connected to a solenoid-operated valve 186. As is the case all other of the solenoid valves employed in the unit, suitable electrical connections to the computer and control cabinet 32 are established from a main electronic connector 191. With the valve 186 in the position depicted, pressure received through line 190 is directed through line 192 to the lines A and C, simultaneously applying lifting force to all of the clamp buttons 54. Shifting the valve 186 to its alternative position directs air pressure through line 194, connected to lines B and D, thereby forcing the clamp buttons 54 downwardly to their clamping positions.

A second line 196 from the Tee connector 188 leads to a second valve 198. One line 200 from the valve 198 conducts pressure to the fixture 91 on the head cylinder 90, thereby providing the means by which the head assembly 26 is moved to its elevated position. Shifting of the valve 198 to its alternate position will direct the air through the line 203 to the connector 93 on the head cylinder, thus applying downward force to the center shaft 88.

A second line 204 extends from the Tee connector 187 and leads to a regulator 205, from which a line 206 connects to a third solenoid valve 207, typically regulated to supply a pressure of about 32 psi. Line 208 connects the valve 207 to the valve 198. When the valve 207 is in its open position, and the valve 198 is shifted to apply downward force to the center shaft, air is delivered through line 208 to the opposite side of the piston in the cylinder 90 so as to apply elevating force through line 200, thus counteracting the downward force applied through line 203. This feature is employed primarily when the cutter is used for making circular or oval cuts in the workpiece, and serves to decrease the rate at which a blade is plunged. By applying the counteracting force for approximately 20° of movement of the head and by overcutting that 20° arc at the end of the stroke, with the full pressure applied (i.e., the counteracting pressure having been removed), nicks and fugitive cuts are avoided to produce a clean and well-defined opening in the workpiece.

Thus it can be seen that the present invention provides a novel system for clamping a sheet of material against an underlying support surface and, more particularly, a clamping system that is especially adapted for use with a cutting head having a glide plate, and in a computerized automated matcutter. The invention also provides a novel cutting head suitable for use in a matcutter, and especially a computerized automated matcutter, wherein operation of the head components is smooth and well controlled and the parts are constructed for facile and precise relative positioning and repositioning.

Having thus described the invention, what is claimed is:

1. A system for clamping sheet material against an underlying support surface, comprising:

a base having a substantially planar support surface with a marginal portion;

a plurality of clamp units, each including a separate clamping member having an axial stem portion and a head portion disposed on one end of said stem portion, said stem portions of said clamping members providing abutment elements against which a sheet material lying on said support surface can be abutted laterally for proper positioning on said support surface, each of said head portions having a substantially flat top surface and a peripheral element extending laterally beyond said abutment element and constructed to engage thereunder an edge portion of a sheet material lying on said support surface and abutted against said abutment element of said stem portion, said clamp units being arranged with said stem portions of said clamping members extending through said marginal portion of said support surface, with said head portions of said clamping members spaced from one another along said marginal portion, and with said peripheral elements of said head portions in overlying relationship to said support surface, said clamping members being movable axially in said clamp units between release and clamp positions with said head portions spaced relatively away from and proximate to said support surface, respectively, said top surfaces of said head portions lying substantially parallel to the plane of said support surface, and said peripheral elements being relatively thin, in the axial direction, to enable said top surfaces to be disposed substantially flush with the surface of a sheet material clamped thereby; and actuating means for effecting movement of said clamping members between said release and clamp positions and for causing each of said clamp units to apply, independently of the other said clamp units and in effective coaction against said support surface, a portion of the total clamping force applied to the sheet material in said clamp positions.

2. The system of claim 1 wherein said marginal portion of said support surface comprises two margin components extending at an angle to one another, and wherein the number and arrangement of said clamp units provides a plurality of said clamping member head portions along each of said margin components.

3. The system of claim 2 wherein the angle between said margin components is 90°.

4. The system of claim 2 comprising at least three rectilinearly aligned head portions along each of said margin components.

5. The system of claim 1 wherein each of said clamp units includes a double-acting pneumatic motor comprised of a piston to which said clamping member is operatively connected, and wherein said actuating means comprises means for selectively delivering pneumatic pressure to opposite sides of said piston of said pneumatic motor.

6. The system of claim 1 wherein said stem portion of each of said clamping members lies generally normal to stop top surface of said head portion thereof, wherein said support surface is planar, and wherein said axis of movement of said each clamping member is normal to said support surface plane.

7. The system of claim 1 wherein said head portion provides a narrow, thin lip extending at least partially about said stem portion, said lip constituting said sheet material-engaging peripheral element.

8. The system of claim 7 wherein said lip has a relatively sharp lower, outer edge.

9. The system of claim 7 wherein said head portion is substantially circular and said lip is substantially annular.

* * * * *

UNITED STATES PATENT AND TRADEMARK OFFICE
CERTIFICATE OF CORRECTION

PATENT NO. : 6,178,860 B1
DATED : January 30, 2001
INVENTOR(S) : Alan R. Peters and Vincent T. Kozyrski It is certified that error appears in the above-identified patent and that said Letters Patent is hereby corrected as shown below:

Claim 6, column 10,
Line 34, delete the word "stop" and substitute -- said --.

Signed and Sealed this

Twenty-fifth Day of September, 2001

Attest:

*Nicholas P. Godici*

NICHOLAS P. GODICI
*Attesting Officer*   *Acting Director of the United States Patent and Trademark Office*